US012756068B2

(12) United States Patent
Adams et al.

(10) Patent No.: US 12,756,068 B2

(45) Date of Patent: Oct. 6, 2026

(54) DRY-PROCESS POLYETHYLENE MEMBRANES, COATED MEMBRANES, SEPARATORS, AND RELATED METHODS

(71) Applicant: Celgard, LLC, Charlotte, NC (US)

(72) Inventors: Changqing Wang Adams, Fort Mill, SC (US); Zhengming Zhang, Rock Hill, SC (US); Stefan Reinartz, Waxhaw, NC (US)

(73) Assignee: Celgard, LLC, Charlotte, NC (US)

( * ) Notice: Subject to any disclaimer, the term of this patent is extended or adjusted under 35 U.S.C. 154(b) by 666 days.

(21) Appl. No.: 18/267,075

(22) PCT Filed: Dec. 14, 2021

(86) PCT No.: PCT/US2021/063186

§ 371 (c)(1),
(2) Date: Jun. 13, 2023

(87) PCT Pub. No.: WO2022/132682

PCT Pub. Date: Jun. 23, 2022

(65) Prior Publication Data

US 2024/0055726 A1 Feb. 15, 2024

Related U.S. Application Data

(60) Provisional application No. 63/125,652, filed on Dec. 15, 2020.

(51) Int. Cl.
*H01M 50/451* (2021.01)
*H01M 50/403* (2021.01)
(Continued)

(52) U.S. Cl.
CPC ....... *H01M 50/451* (2021.01); *H01M 50/403* (2021.01); *H01M 50/417* (2021.01); *H01M 50/434* (2021.01); *H01M 50/457* (2021.01)

(58) Field of Classification Search
CPC ............. H01M 50/451; H01M 50/403; H01M 50/417; H01M 50/457; H01M 50/434
See application file for complete search history.

(56) References Cited

U.S. PATENT DOCUMENTS

| | | | | |
|---|---|---|---|---|
| 6,080,507 | A | 6/2000 | Yu | |
| 10,003,058 | B2 * | 6/2018 | Call | B29C 48/32 |

(Continued)

FOREIGN PATENT DOCUMENTS

| | | | |
|---|---|---|---|
| CA | 2250254 | A1 | 10/1997 |
| CN | 1758463 | A | 4/2006 |

(Continued)

OTHER PUBLICATIONS

EP2830125 translation (Year: 2015).*

(Continued)

*Primary Examiner* — Jane J Rhee

(74) *Attorney, Agent, or Firm* — J. Clinton Wimbish; Maynard Nexsen PC

(57) ABSTRACT

This application is directed to dry-process porous membranes comprising polyethylene and to methods for forming such membranes. Some of the dry-process porous membranes may comprise polyethylene that has been irradiated with electron-beam irradiation. The dry-process porous membranes disclosed herein may be used in the following: lithium ion batteries, including those utilizing nickel manganese cobalt oxide (NMC), lithium metal, or lithium iron phosphate (LFP) chemistries, and/or large format lithium ion batteries, textiles, garments, PPE, filters, medical products, house products, fragrance devices, and/or disposable lighters. In at least one embodiment, a multilayer porous membrane, comprises a dry-process polyethylene layer that has been treated with electron-beam radiation; and, an additional layer that has not been treated with electron-beam irradiation; and, optionally: wherein a dosage of the elec-
(Continued)

tron-beam radiation is from 20 kGy to 250 kGy, 50 kGy to 250 kGy, from 60 kGy to 200 kGy, from 70 kGy to 150 kGy, or from 80 kGy to 140 kGy; wherein the additional layer is laminated to the dry-process polyethylene layer that has been treated with electron-beam radiation; or wherein a blocking layer is laminated with a dry-process polyethylene layer and the additional layer to form a structure with the blocking layer between the dry-process polyethylene layer and the additional layer, and wherein the dry-process polyethylene layer is treated with electron beam irradiation to form the dry-process polyethylene layer that has been treated with electron-beam radiation. Also described is a textile, garment, PPE, filter, medical product, house product, fragrance device, or disposable lighter comprising the inventive membrane.

8 Claims, 2 Drawing Sheets

(51) Int. Cl.

| | |
|---|---|
| ***H01M 50/417*** | (2021.01) |
| ***H01M 50/434*** | (2021.01) |
| ***H01M 50/457*** | (2021.01) |

(56) References Cited

U.S. PATENT DOCUMENTS

| | | | |
|---|---|---|---|
| 2008/0118827 | A1 | 5/2008 | Call et al. |
| 2009/0243159 | A1 | 10/2009 | Sun |
| 2012/0077898 | A1 | 3/2012 | Jacob |
| 2016/0301052 | A1* | 10/2016 | Adams .................... B32B 27/32 |
| 2020/0052269 | A1 | 2/2020 | Taguchi et al. |
| 2020/0067046 | A1 | 2/2020 | Adams et al. |

FOREIGN PATENT DOCUMENTS

| | | | |
|---|---|---|---|
| CN | 100460203 | C | 2/2009 |
| CN | 102549064 | A | 7/2012 |
| EP | 2263784 | B1 | 3/2012 |
| EP | 2057014 | B1 | 7/2014 |
| KR | 10-2005-0017003 | A | 2/2005 |
| KR | 10-2016-0147721 | A | 12/2016 |
| WO | 2015/166848 | A1 | 11/2015 |
| WO | 2019/217791 | A2 | 11/2019 |
| WO | 2020/142702 | A1 | 7/2020 |

OTHER PUBLICATIONS

JPH0813337 translation (Year: 1996).*

First office action received for Chinese Patent Application No. 202180092791.3, mailed on Apr. 18, 2025, 25 pages including English translation.

Extended European Search Report received for European Patent Application No. 21907588.4, mailed on Sep. 27, 2024, 09 pages.

International Search Report and Written Opinion received for International Patent Application No. PCT/US2021/063186, mailed on Apr. 7, 2022, 15 pages.

International preliminary report on patentability received for International Patent Application No. PCT/US2021/063186, mailed on Jun. 29, 2023, 11 pages.

* cited by examiner

DRY-PROCESS POLYETHYLENE MEMBRANES, COATED MEMBRANES, SEPARATORS, AND RELATED METHODS

RELATED APPLICATIONS

This application is a 371 U.S. Patent Application to PCT Application No. PCT/US2021/063186, filed Dec. 14, 2021, which claims priority to U.S. Provisional Application No. 63/125,652, filed Dec. 15, 2020, which are incorporated herein by reference in their entireties.

FIELD

This application is directed to dry-process porous membranes comprising polyethylene and to methods for forming such membranes. Some of the dry-process porous membranes may comprise polyethylene that has been irradiated with electron-beam irradiation. The dry-process porous membranes disclosed herein may be used in the following: lithium ion batteries, including those utilizing nickel manganese cobalt oxide (NMC) or lithium iron phosphate (LFP) chemistries and large format lithium ion batteries.

BACKGROUND

Electron beam irradiation has been applied to membranes comprising polyethylene, including a polyethylene homopolymer, a polyethylene copolymer, or a blend of polyethylene and another polymer. See, for example, U.S. Pat. No. 10,461,293, which is incorporated by reference herein in its entirety.

Electron beam irradiation causes cross-linking, which among other things, improves the high temperature performance of the film. However, electron beam Irradiation also causes chain scission reactions to occur. Chain scission results in beneficial properties, such as lowering of the shutdown temperature resulting in improved safety when the membrane is used as a battery separator, but also results in weakening of the membrane. Weakening may include, drop in TD tensile strength, puncture strength, or both. Chain scission reactions are more prevalent when higher doses of electron beam irradiation are applied to the film.

Thus, there is a need to compensate for some of the drawbacks of electron-beam irradiation, while maintaining the benefits.

SUMMARY

The invention described herein solves some of the problems described hereinabove.

In one aspect, a multilayer porous membrane comprising the following is described: (1) a dry-process polyethylene layer that has been treated with electron-beam radiation; and (2) an additional layer that has not been treated with electron-beam irradiation. The dry-process polyethylene layer may have been treated with a dosage of the electron-beam radiation is from 20 kGy to 250 kGy, from 50 kGy to 250 kGy, from 60 kGy to 200 kGy, from 70 kGy to 150 kGy, or from 80 kGy to 140 kGy. The additional layer may be a dry-process polyethylene layer, e.g., a dry-process polyethylene layer that has not been treated with electron-beam irradiation.

In some embodiments, the multilayer porous membrane may be formed by laminating the additional layer to the dry-process polyethylene layer that has been treated with electron-beam radiation.

In some embodiments of the multilayer porous membrane, a blocking layer may be placed between the additional layer and the dry-process polyethylene layer that has been treated with electron-beam radiation. In such an embodiment, the multilayer porous membrane may be formed by laminating a blocking layer with a dry-process polyethylene layer and the additional layer to form a structure with the blocking layer between the dry-process polyethylene layer and the additional layer. The dry-process polyethylene layer is then treated with electron beam irradiation to form the dry-process polyethylene layer that has been treated with electron-beam radiation. In such an embodiment, the blocking layer may function to protect the additional layer from the negative effects of electron-beam irradiation, including extensive chain scission reactions.

In another embodiment described herein, the dry-process polyethylene layer that has been treated with electron-beam irradiation and the additional layer are co-extruded layers. In some preferred embodiments herein, a blocking layer may be co-extruded between a dry-process polyethylene layer and the additional layer, and then the dry-process polyethylene layer may treated with electron beam irradiation to form the dry-process polyethylene layer that has been treated with electron-beam radiation. In such an embodiment, the blocking layer may function to protect the additional layer from the negative effects of electron-beam irradiation, including extensive chain scission reactions.

The multilayer porous membrane described above may further comprise a coating on at least one surface of the membrane, wherein the coating is at least one selected from the group consisting of a ceramic coating, a polymer coating, a sticky coating, a shutdown coating, a cross-linkable coating, and combinations thereof.

In another aspect, a method for forming a multilayer porous membrane described above is described. The method comprises irradiating a dry-process polyethylene layer with electron-beam irradiation. A dose of the electron-beam irradiation may be from 20 kGy to 250 kGy, from 50 kGy to 250 kGy, from 60 kGy to 200 kGy, from 70 kGy to 150 kGy, or from 80 kGy to 140 kGy.

In another aspect, a porous membrane comprising at least one dry-process polyethylene layer is described. Here, the dry-process polyethylene layer comprises polyethylene and an additive that allows cross-linking to occur when a dose of the electron-beam irradiation that is less than 70 kGy is applied. A dose of electron-beam irradiation that is less than 70 kGy has been applied to the dry-process polyethylene layer of the porous membrane.

In other embodiments, the polyethylene layer of the porous membrane comprises an additive that allows cross-linking to occur when a dose of the electron-beam irradiation that is less than 50 kGy is applied, and a dose of the electron-beam irradiation that is less than 50 kGy has been applied to the dry-process polyethylene layer of the porous membrane.

The additive may be a polymer having a lower crystallinity than the polyethylene. In some embodiments, the additive is a metallocene polyethylene. The additive may be present in an amount of 1 to 50%.

In some embodiments, the porous membrane described above may comprises a coating on at least one surface of the membrane, wherein the coating is at least one selected from the group consisting of a ceramic coating, a polymer coating, a sticky coating, a shutdown coating, a cross-linkable coating, and combinations thereof.

In another aspect, a method for forming a porous membrane as described herein above is disclosed. The method comprises at least a step of irradiating a dry-process polyethylene layer that comprises polyethylene and an additive that allows cross-linking to occur when a dose of the electron-beam irradiation that is less than 70 kGy or less than 50 kGy is applied with electron-beam irradiation. The applied dose may be less than 70 kGy or less than 50 kGy.

In another aspect, a dry-process porous membrane comprising at least two or at least three co-extruded polyethylene layers. The dry-process porous membrane may comprise a coating on at least one surface of the membrane, wherein the coating is at least one selected from the group consisting of a ceramic coating, a polymer coating, a sticky coating, a shutdown coating, a cross-linkable coating, and combinations thereof.

DESCRIPTION OF THE DRAWINGS

For the purpose of illustrating the invention, there is shown in the drawings a form which is presently preferred; it being understood, however, that this invention is not limited to the precise arrangements and instrumentalities shown.

DESCRIPTION

An improved polyethylene-containing dry-process porous membrane is disclosed herein. The membrane may be a monolayer membrane, a bilayer membrane, a trilayer membrane or a multilayer membrane that has two or more, three or more, four or more, or five or more layers.

Figure 1:
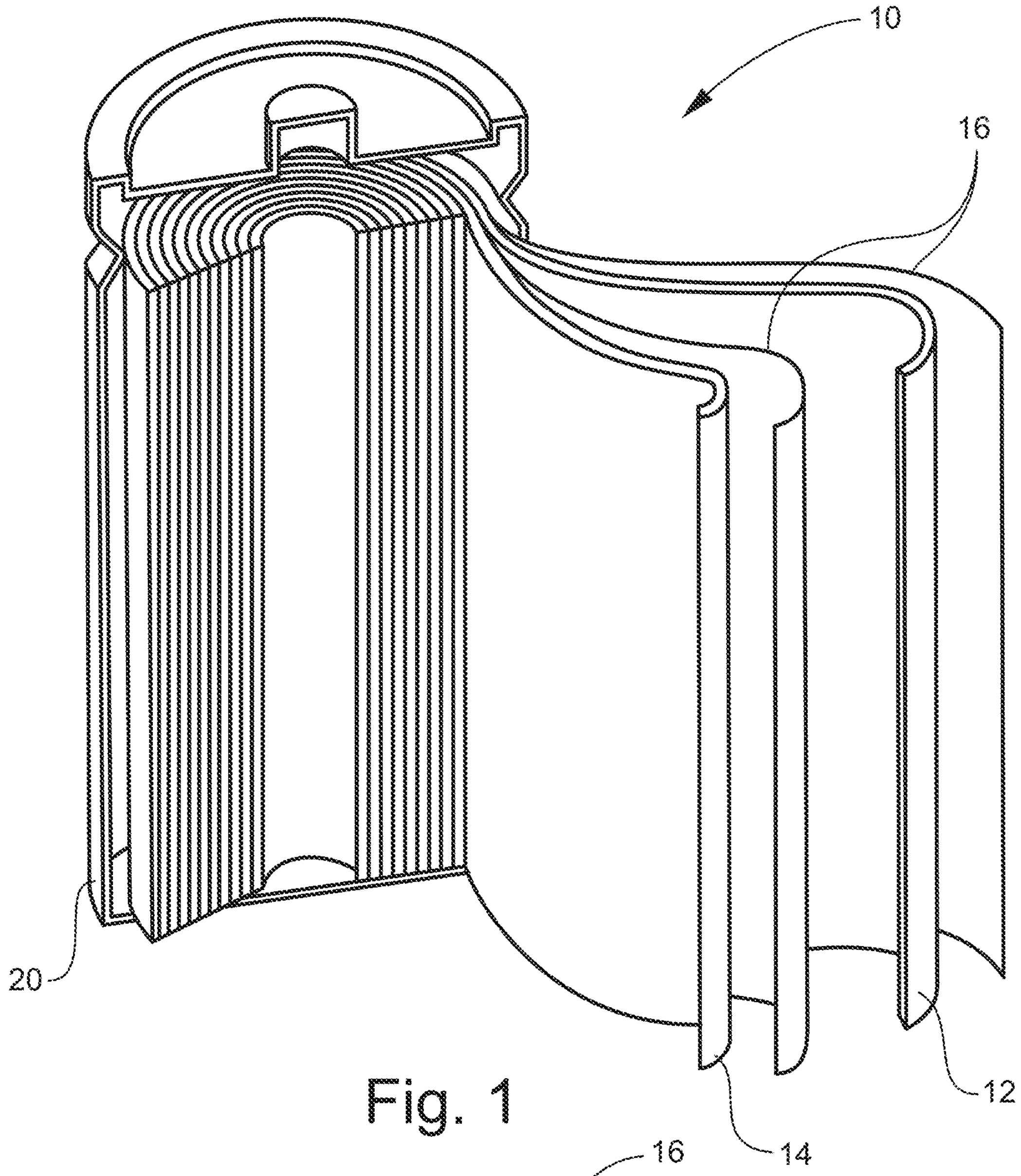
FIG. 1 is a sectional view of a lithium ion battery.

Referring to the figures, wherein like numerals indicate like elements, there is shown in FIG. 1 a lithium ion battery (or cell) 10. Lithium ion cell 10 comprises, for example, an anode 12, a cathode 14, and a separator 16 disposed between anode 12 and cathode 14, all of which is packaged within a can 20. The illustrated cell 10 is a cylindrical cell or 'jelly roll' cell, but the invention is not so limited. Other configurations, for example, prismatic cells, button cells, or polymer cells are also included. Additionally, not shown is the electrolyte. The electrolyte may be a liquid (organic or inorganic), or a gel (or polymer). The invention will be, for convenience, described with regard to a cylindrical cell with a liquid organic electrolyte, but it is not so limited and may find use in other cell types (e.g. LFP, NMC, energy storage system, capacitor, super capacitor, double layer capacitor, or combined cell and capacitor) and other configurations.

The anode 12 may in at least certain embodiments have an energy capacity greater than or equal to 372 mAh/g, preferably ≥700 mAh/g, and most preferably ≥1000 mAH/g. Anode 12 may be constructed from a lithium metal foil or a lithium alloy foil (e.g. lithium aluminum alloys), or a mixture of a lithium metal and/or lithium alloy and materials such as carbon (e.g. coke, graphite), nickel, copper. The anode 12 in at least selected embodiments may not be made solely from intercalation compounds containing lithium or insertion compounds containing lithium.

The cathode 14 may be any cathode compatible with the anode and may include an intercalation compound, an insertion compound, or an electrochemically active polymer. Suitable intercalation materials include, for example, MoS2, FeS2, MnO2, TiS2, NbSe3, LiCoO2, LiNiO2, LiMn2O4, V6O13, V2O5, and CuCl2. Suitable polymers include, for example, polyacetylene, polypyrrole, polyaniline, and polythiopene.

The electrolyte may be liquid or gel (or polymer). Typically, the electrolyte primarily consists of a salt and a medium (e.g. in a liquid electrolyte, the medium may be referred to as a solvent; in a gel electrolyte, the medium may be a polymer matrix). The salt may be a lithium salt. The lithium salt may include, for example, LiPF6, LiAsF6, LiCF3SO3, LIN(CF3SO3)3, LiBF6, and LiClO4, BETTE electrolyte (commercially available from 3M Corp. of Minneapolis, MN) and combinations thereof. Solvents may include, for example, ethylene carbonate (EC), propylene carbonate (PC), EC/PC, 2-MeTHF(2-methyltetrahydrofuran)/EC/PC, EC/DMC (dimethyl carbonate), EC/DME (dimethyl ethane), EC/DEC (diethyl carbonate), EC/EMC (ethylmethyl carbonate), EC/EMC/DMC/DEC, EC/EMC/DMC/DEC/PE, PC/DME, and DME/PC. Polymer matrices may include, for example, PVDF (polyvinylidene fluoride), PVDF:THF (PVDF:tetrahydrofuran), PVDF:CTFE (PVDF:chlorotrifluoro ethylene), PVDF:HFP (Poly (vinylidene fluoride-co-hexafluoropropylene), PAN (polyacrylonitrile), and PEO (polyethylene oxide).

Figure 2:
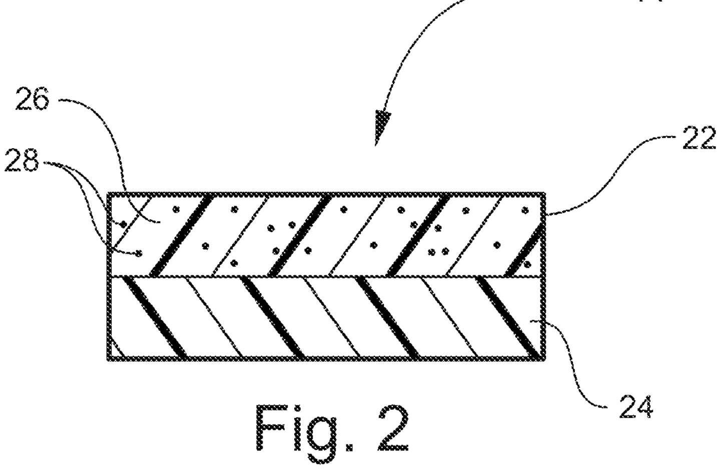
FIG. 2 is a schematic cross-sectional view of a ceramic coated PE membrane separator.

Referring to FIG. 2, separator 16 is shown. Separator 16 comprises a ceramic composite layer or coating 22 and a polymeric microporous layer 24, preferably a dry process polyethylene (PE) membrane or film (monolayer or multilayer). The ceramic composite layer or coating is, at least, adapted for preventing electronic shorting (e.g. direct or physical contact of the anode and the cathode) and blocking dendrite growth, or may have many other benefits such as reducing shrinkage, enhancing safety, high temperature melt integrity, electrolyte reservoir, improving wettability, oxidation resistance, ion trap, HF scavenging, etc. The polymeric microporous layer may be adapted for blocking (or shutting down) ionic conductivity (or flow) between the anode and the cathode during the event of thermal runaway. The ceramic composite layer 22 of separator 16 may be porous or non-porous and should be sufficiently ionically conductive in electrolyte to allow ionic flow between the anode and cathode, so that current, in desired quantities, may be generated by the cell. The layers 22 and 24 should adhere well to one another, i.e. separation should not occur at least during battery manufacture. The layers 22 and 24 may be formed by lamination, coextrusion, or coating processes. Ceramic composite layer 22 may be a coating or a discrete layer, either having a thickness ranging from 0.001 micron to 50 microns, preferably in the range of 0.01 micron to 25 microns. Polymeric microporous layer 24 is preferably a discrete membrane (monolayer or multilayer or singleply or multiple plies) having a thickness ranging from 2 microns to 150 microns, preferably in the range of 4 microns to 25 microns. The overall thickness of separator 16 is in the range of 2.001 microns to 200 microns, preferably in the range of 5 microns to 50 microns, most preferably in the range of 5 microns to 15 microns.

Ceramic composite layer 22 comprises a matrix material 26 having inorganic particles 28 dispersed therethrough. Ceramic composite layer 22 is porous or nonporous prior to or after adding electrolyte (may swell or gel in electrolyte, may wet with electrolyte, some pores may be formed or closed once in contact with an electrolyte, with ion conductivity of layer 22 is primarily dependent upon choice of the matrix material 26 and particles 28). The matrix material 26 of layer 22 differs from the foregoing polymer matrix (i.e., that discussed above in regard to the medium of the electrolyte) in, at least, function. Namely, matrix material 26 is that component of a separator which, in part, may prevent electronic shorting by preventing dendrite growth; whereas, the polymer matrix is limited to the medium that carries the dissociated salt by which current is conducted within the cell. The matrix material 26 may, in addition, also perform the same function as the foregoing polymer matrix (e.g., carry the electrolyte salt). The matrix material 26 comprises about 1-99% by weight of the ceramic composite layer 22, and the inorganic particles 28 form approximately 1-99% by weight of the layer 22. Preferably, composite layer 22 contains inorganic particles 20%-98% by weight. Most preferably, composite layer 22 contains inorganic particles 40%-90% by weight.

The matrix material 26 may be ionically conductive or non-conductive, so any gel forming polymer suggested for use in lithium polymer batteries or in solid electrolyte batteries may be used. The matrix material 26 may be selected from, for example, polyethylene oxide (PEO), polyvinylidene fluoride (PVDF), polytetrafluoroethylene (PTFE), polyurethane, polyacrylonitrile (PAN), polymethylmethacrylate (PMMA), polytetraethylene glycol diacrylate, copolymers thereof, and mixtures thereof. The preferred matrix material is PVDF and/or PEO and their copolymers. The PVDF copolymers include PVDF:HFP (polyvinylidene fluoride:hexafluoropropylene) and PVDF:CTFE (polyvinylidene fluoride:chlorotrifluoroethylene). Most preferred matrix materials include PVDF:CTFE with less than 23% by weight CTFE, PVDH:HFP with less than 28% by weight HFP, any type of PEO, and mixtures thereof.

The inorganic particles 28 are normally considered non-conductive, however, these particles, when in contact with the electrolyte, appear, the inventor, however, does not wish to be bound hereto, to develop a superconductive surface which improves the conductivity (reduces resistance) of the separator 16. The inorganic particles 28 may be selected from, for example, silicon dioxide (SiO2), aluminum oxide (Al2O3), boehmite, calcium carbonate (CaCO3), titanium dioxide (TiO2), SiS2, SiPO4 and the like, or mixtures thereof. The preferred inorganic particle is SiO2, Al2O3, and CaCO3. The particles may have an average particle size in the range of 0.001 micron to 25 microns, most preferably in the range of 0.01 micron to 2 microns.

The microporous polymeric layer 24 is typically a microporous membranes (e.g., single ply or multi-ply), for example, dry process PE membranes produced by Celgard, LLC of Charlotte, North Carolina, USA. The layer 24 may have a porosity in the range of 20-80%, preferably in the range of 40-70%. The layer 24 may have an average pore size in the range of 0.02 to 2 microns, preferably in the range of 0.05 to 0.5 micron. The layer 24 may has a JIS Gurley Number in the range of 5 to 150 sec, preferably 10 to 80 sec. (Gurley Number refers to the time it takes for 10 cc of air at 12.2 inches of water to pass through one square inch of membrane.) The layer 24 is preferably polyethylene, polyethylene-containing, and blends of polyethylene with polypropylene or other polymers, materials, or additives. Polyethylene is most preferred.

The foregoing separator, while primarily designed for use in high energy rechargeable lithium ion batteries, may be used in other battery systems in which dendrite growth may be a problem.

Polyethylene-containing means that one or more layers of the membrane comprise, consist of, or consist essentially of polyethylene (PE). Preferably, one or more of the layers comprises 50% or more, 60% or more, 70% or more, 80% or more, 90% or more, 95% or more, or 100% polyethylene.

Figure 3:
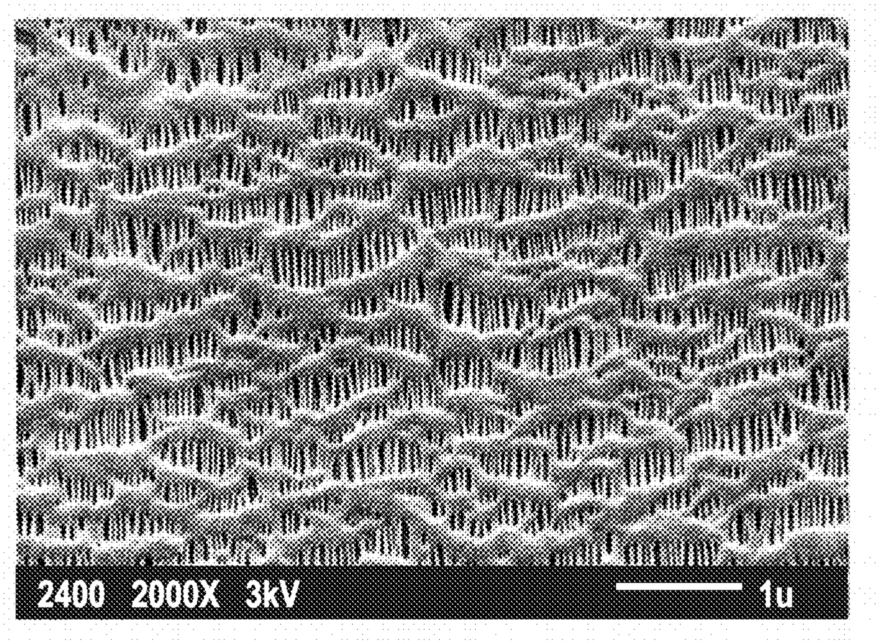
FIG. 3 is a surface SEM of a uniaxially stretched dry-stretch process membrane or film.
Figure 4:
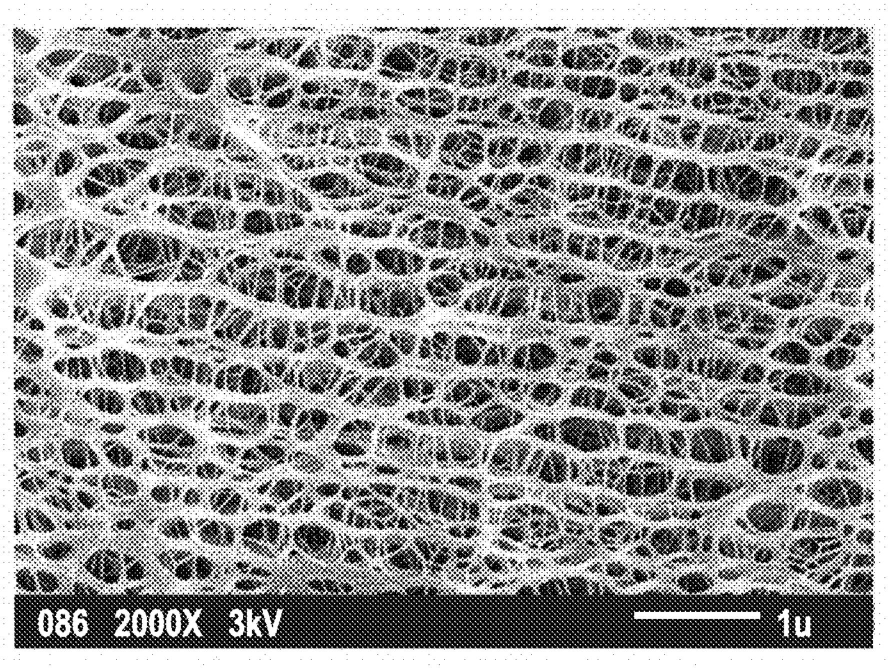
FIG. 4 is a surface SEM of a biaxially stretched dry-stretch process membrane or film.

Dry-process, as understood by those skilled in the art, means that at least one layer of the membrane is formed by a dry-stretch process such as the Celgard dry-stretch process, which includes, but is not necessarily limited an extrusion step to form a non-porous precursor and a stretching step that forms pores in the non-porous precursor. In the extrusion step, a polymer is extruded "dry" or without the use of solvents or oils. In the stretching step, stretching may be uniaxial, biaxial, or multi-axial. In some embodiments, a dry-process may include a method where inorganic or organic particles are extruded with the polymer, and pores are formed around the particles in the non-porous precursor. An example of a film formed by such a process may include a beta-nucleated biaxially-oriented polypropylene (BN-POPP) film or a film formed by a particle-stretch method. A film formed by a dry-stretch process has a characteristic pore that is exemplified in FIG. or FIG. 3 (uniaxially stretched) and FIG. or FIG. 4 (biaxially stretched).

Porous may mean that the membrane is macroporous, mesoporous, microporous, or nanoporous.

In some embodiments, a coating may be formed on one or more surfaces of the membranes described herein. The coating may comprise, consist of, or consist essentially of at least one selected from the group consisting of a ceramic coating, a polymer coating, a sticky coating, a shutdown coating, a cross-linkable coating, and combinations thereof. In some embodiments, the coating may comprise two or more layers. For example, the coating may comprise, consist of, or consist essentially of a ceramic coating with a sticky coating formed thereon. In some embodiments, a single coating layer may be multi-functional. For example, it may function as a ceramic coating (e.g., providing heat resistance) and a sticky coating (e.g., providing electrode adhesion when dry, when wet with electrolyte, or when dry and when wet with electrolyte).

The coated or uncoated membrane may be further treated, coated, deposited, dipped, calendered, embossed, laminated to a non-woven, surfactant coated, wound, stacked, wrapped, pocketed, and/or the like The uses of the membranes described herein are limitless. In some preferred embodiments, they may be used in lithium ion batteries, including those utilizing nickel manganese cobalt oxide (NMC) or lithium iron phosphate (LFP) chemistries and large format lithium ion batteries. They may also be used in capacitors, textiles, filtering devices, garment, PPE, filter media, medical product, house product, fragrance device, disposable lighter, and/or the like.

Embodiment 1

In one aspect, a multilayer membrane comprises, consists of, or consists essentially of at least the following: a dry-process polyethylene layer that has been treated with electron-beam irradiation; and an additional layer that has not been treated with electron-beam irradiation. The additional layer may be added to compensate for some of the drawbacks of electron-beam irradiation, while maintaining the benefits. The membrane may also have further additional layers. In some preferred embodiments, the additional layer may be a dry-process polyethylene layer that has not been treated with electron-beam irradiation.

The dose of electron-beam irradiation may be higher for such embodiments. For example, it may be from 20 kGy to 250 kGy, from 50 kGy to 250 kGy, from 60 kGy to 200 kGy, from 70 kGy to 150 kGy, or from 80 kGy to 140 kGy. This dose causes cross-linking of the polyethylene.

The multilayer membrane may be formed by laminating a dry-process polyethylene layer together with an additional layer. In some preferred embodiments, the dry-process polyethylene layer should be treated with electron-beam irradiation before being laminated to the additional layer. This avoids negatively affecting the additional layer with the irradiation, which may occur if the dry-process polyethylene layer together is laminated to the additional layer before treating the dry-process polyethylene layer with electron-beam irradiation.

In embodiments where the dry-process polyethylene layer is laminated to the additional layer before treating the dry-process polyethylene layer with electron-beam irradiation, it may be preferred to include a blocking layer between the dry-process polyethylene layer and the additional layer. Such a structure may be formed by laminating a blocking layer with the dry-process polyethylene layer and the additional layer. In other embodiments, the blocking layer and the additional layer may be co-extruded together and laminated with the dry-process polyethylene layer. The blocking layer could also be co-extruded with the dry-process polyethylene layer and then laminated to the additional layer.

The composition of the blocking layer is not so limited. When electron-beam irradiation is applied from a side of the multilayer porous membrane closest to the dry-process polyethylene layer, the blocking layer partially or completely blocks the irradiation from reaching the additional layer. Partially may mean that the layer blocks 10% or more 30% or more, 60% or more, 60% or more, 70% or more, 80% or more, 90% or more, or 95% or more of the irradiation from reaching the additional layer. An exemplary blocking layer may include a polymer and inorganic particles that may absorb the irradiation.

In other embodiments, the multilayer membrane may be formed by co-extruding a dry-process polyethylene layer with the additional layer and then treating the dry-process polyethylene layer with electron-beam irradiation to form the dry-process polyethylene layer that has been treated with electron-beam irradiation. Sometimes, it may be preferred to provide a blocking layer between the dry-process polyethylene layer and the additional layer to partially or completely blocks the irradiation from reaching the additional layer when electron-beam irradiation is applied from a side closest to the dry-process polyethylene layer.

Embodiment 2

In this embodiment, a porous membrane comprising at least one dry-process polyethylene layer is disclosed. The dry-process polyethylene layer comprises, consists of, or consists essentially of polyethylene and an additive that allows cross-linking to occur at a lower electron-beam irradiation dose, e.g., a dose that causes reduced chain scission reactions to occur or causes no chain scission reactions to occur. For example, the additive may allow cross-linking to occur at electron beam irradiation doses less than 70 kGy, less than 60 kGy, less than 50 kGy, less than 40 kGy, less than 30 kGy, less than 20 kGy, or less than 10 kGy. In preferred embodiments, the dry-process polyethylene layer of the above-described porous membrane has been treated with an electron beam irradiation dose less than 70 kGy, less than 60 kGy, less than 50 kGy, less than 40 kGy, less than 30 kGy, less than 20 kGy, or less than 10 kGy.

The additive is not so limited as long as it allows cross-linking to occur when an electron beam dose is less than 70 kGy, less than 60 kGy, less than 50 kGy, less than 40 kGy, less than 30 kGy, less than 20 kGy, or less than 10 kGy. In some embodiments, the additive may be a polymer having a lower crystallinity than the polyethylene used in the porous membrane. In some embodiments, the additive may be a metallocene polyethylene.

The amount of the additive is not so limited. Any amount that allows the additive to serve its purpose of allowing cross-linking at lower electron beam irradiation doses will suffice. For example, the additive may be added in an amount from 1 to 50%, from 1 to 45%, from 1 to 40%, from 1 to 35%, from 1 to 30%, from 1 to 25%, from 1 to 20%, from 1 to 15%, from 1 to 10%, or from 1 to 5%.

Embodiment 3

In this embodiment, a dry-process porous multilayer membrane comprising, consisting of, or consisting essentially of at least two, at least three, at least four, at least five, at least six, at least seven, at least eight, at least nine, or at least 10 co-extruded dry-process polyethylene layers is disclosed. The composition of the polyethylene layers may be the same or different, but each contains more than 50% polyethylene. For example, one of the co-extruded layers may include only polyethylene and the other layer may comprise a blend of one or more additional polymers with 50% or more polyethylene.

EXAMPLES

Example 1: In Example 1, a dry-process porous membrane was formed by co-extruding two of the same composition consisting of a polyethylene to form a non-porous precursor. The non-porous precursor was then stretched to form pores resulting in a dry-process porous membrane with two co-extruded dry-process porous polyethylene layers. A ceramic coating was then formed on at least one side of the dry-process porous membrane.

Example 2: In Example 2, a dry-process porous membrane was formed by co-extruding two different compositions comprising at least 50% polyethylene to form a non-porous precursor. The non-porous precursor was then stretched to form pores resulting in a dry-process porous membrane with two co-extruded dry-process porous polyethylene layers. A ceramic coating was then formed on at least one side of the dry-process porous membrane.

Example 3: In Example 3, a dry-process porous polyethylene layer was formed and electron beam irradiation was applied to the layer in a dose of 150 kGy to form a treated dry-process porous polyethylene layer. Then, the treated dry-process porous polyethylene layer was laminated to another dry-process porous polyethylene layer that had not been treated with electron beam irradiation.

Example 4: In Example 4, a blocking layer was laminated between two dry-process porous polyethylene layers, and then electron beam irradiation was applied in a dose of 150 kGy to one of the dry-process porous polyethylene layers. The blocking layer blocked more than 80% of the irradiation from reaching the other dry-process porous polyethylene layer. The resulting product had one treated and one non-treated dry-process porous polyethylene layer.

Example 5: In Example 5, a composition comprising more than 50% polyethylene, a blocking layer composition, and another composition comprising more than 50% polyethylene were co-extruded in that order to form a non-porous precursor. The non-porous precursor was then stretched to form pores resulting in a structure comprising a dry-process polyethylene porous layer, a blocking layer, and another dry-process polyethylene porous layers. One of the dry-process polyethylene porous layers was then treated with an electron beam irradiation dose of 150 kGy. The blocking layer blocked more than 80% of the irradiation from reaching the other dry-process porous polyethylene layer.

Example 6: In Example 6, a composition comprising polyethylene and a metallocene polyethylene was extruded to form a non-porous precursor. The non-porous precursor was then stretched to form pores resulting in a dry-process porous polyethylene layer. Then an electron beam irradiation does less than 70 kGy was applied to the dry-process porous polyethylene layer.

What is claimed:

1. A porous membrane comprising at least one dry-process polyethylene layer comprising:

polyethylene; and an additive that allows cross-linking to occur when a dose of the electron-beam irradiation that is less than 70 kGy is applied, wherein a dose of the electron-beam irradiation that is less than 70 kGy has been applied to the dry-process polyethylene layer.

2. The porous membrane of claim 1, wherein the additive allows cross-linking to occur when a dose of the electron-beam irradiation that is less than 50 kGy is applied, and wherein a dose of the electron-beam irradiation that is less than 50 kGy has been applied to the dry-process polyethylene layer;

wherein the additive is a polymer having a lower crystallinity than the polyethylene;

wherein the additive is a metallocene polyethylene; or wherein the additive is present in an amount of 1 to 50%.

3. The porous membrane of claim 1, further comprising a coating on at least one surface of the membrane, wherein the coating is at least one selected from the group consisting of a ceramic coating, a polymer coating, a sticky coating, a shutdown coating, a cross-linkable coating, and combinations thereof.

4. A method for forming a porous membrane according to claim 1, comprising irradiating a dry-process polyethylene layer that comprises polyethylene and an additive that allows cross-linking to occur when a dose of the electron-beam irradiation that is less than 70 kGy or less than 50 kGy is applied with electron-beam irradiation.

5. The method of claim 4, wherein a dose of electron-beam irradiation less than 70 kGy or less than 50 kGy is applied.

6. A battery separator comprising the porous membrane of claim 1.

7. A battery, LFP battery, NMC battery, or capacitor comprising the separator of claim 6.

8. A textile, garment, PPE, filter, medical product, house product, fragrance device, or disposable lighter comprising the membrane of claim 1.

* * * * *